(12) United States Patent
Ochiai et al.

(10) Patent No.: US 7,806,136 B2
(45) Date of Patent: Oct. 5, 2010

(54) WAFER-TYPE DIRECT-ACTING VALVE

(75) Inventors: Masaru Ochiai, Komaki (JP); Hisayuki Yamaguchi, Komaki (JP)

(73) Assignee: Kane Kougyou Co., Ltd., Komaki-shi, Aichi-ken (JP)

( * ) Notice: Subject to any disclaimer, the term of this patent is extended or adjusted under 35 U.S.C. 154(b) by 376 days.

(21) Appl. No.: 11/603,478

(22) Filed: Nov. 22, 2006

(65) Prior Publication Data
US 2007/0131280 A1 Jun. 14, 2007

(30) Foreign Application Priority Data
Dec. 12, 2005 (JP) ............................. 2005-357257

(51) Int. Cl.
F16K 27/02 (2006.01)
G05D 16/08 (2006.01)
(52) U.S. Cl. .............................. 137/454.2; 137/505.41
(58) Field of Classification Search ............. 137/454.2, 137/505.41, 505.29, 505.34, 505.35, 505.36; 251/148, 151
See application file for complete search history.

(56) References Cited

U.S. PATENT DOCUMENTS

| 508,133 | A | * | 11/1893 | Gold | 137/505.35 |
| 3,001,550 | A | * | 9/1961 | Engel | 137/625.34 |
| 3,218,024 | A | * | 11/1965 | Kroekel | 251/58 |
| 3,338,140 | A | * | 8/1967 | Sheesley | 251/58 |
| 3,346,005 | A | * | 10/1967 | Hanssen | 137/375 |
| 3,451,431 | A | * | 6/1969 | Royer | 137/454.5 |
| 3,521,666 | A | * | 7/1970 | Scaramucci | 137/454.2 |
| 3,627,258 | A | * | 12/1971 | Scaramucci | 251/152 |
| 3,672,632 | A | * | 6/1972 | Chow | 251/151 |
| 4,471,799 | A | * | 9/1984 | Buck | 137/315.11 |
| 2008/0078967 | A1 | * | 4/2008 | Ochiai et al. | 251/61 |

FOREIGN PATENT DOCUMENTS

JP 6-37446 9/1994

OTHER PUBLICATIONS

Japanese Industrial Standards Committee, "Glossary of Terms for Valves JIS B 0100-1984", Japanese Standards Association, First edition on Feb. 28, 1985, p. 37, No. 10307, p. 38, No. 10705 (4 pages).

* cited by examiner

*Primary Examiner*—Stephen Hepperle
(74) *Attorney, Agent, or Firm*—Flynn, Thiel, Boutell & Tanis, P.C.

(57) ABSTRACT

In the direct-acting valve of the present invention, no flange is formed in the valve box and the piping is achieved by interposing the valve box between pipe flanges. The direct acting valve includes: a driving section that operates by sensing a primary pressure or a secondary pressure; and a valve body communicating with the driving section to open and close a flow path. A valve box of the valve is positioned between pipe flanges tightened by bolts and nuts. Connecting end portions to be mated with pipe flanges respectively have an inlet and an outlet of the flow path, and each of the end portions is formed to have a smaller diameter than that of the pipe flange. A cover flange neck is extended upward from the valve box is formed so as to be interposed between the bolts B and B1 which are provided between the pipe flanges and adjacent to each other on the circumference of the pipe flanges.

13 Claims, 4 Drawing Sheets

WAFER-TYPE DIRECT-ACTING VALVE

FIELD OF THE INVENTION

The present invention relates to a wafer-type direct-acting valve in which a direct-acting valve, such as a pressure adjusting valve such as a pressure reducing valve, a solenoid valve, and a constant water level valve, is sandwiched between pipe flanges and is fixed by bolts and the like penetrated through the pipe flanges.

DESCRIPTION OF THE RELATED ART

Conventionally, there is a wafer-type valve in which a valve box is interposed between pipe flanges and the pipe flanges are fixed by tightening by bolts and nuts. As this type of valve, there are a single-plate check valve and a flangeless butterfly valve. In these valves, a thin disc-shaped valve body swings or rotates in a thin cylindrical valve box through which a fluid flows lineally, so as to open and close the flow path. These valves are relatively simple in the structures and operations (for example, see Japanese Industrial Standards Committee, "Glossary of Terms for valves JIS B 0100-1984", Japanese Standards Association, First edition on Feb. 28, 1985, p. 37, No. 10307, p. 38, No. 10705).

On the other hand, there is a direct-acting valve in which a valve body is connected to a driving section via a valve bar. In this valve, when the driving section senses a primary pressure or a secondary pressure, it drives the valve body to move upward or downward so as to open or close the flow path. A valve box of the direct-acting valve is formed with an S-shaped flow path extending from the inlet to the outlet which are suitable for completely closing the valve and controlling the flow rate. In addition, an end portion for connection with the pipe members are in the form of a flange, so called flange-shaped end portions are widely employed for low-pressure application to high-pressure application (for example, see Japanese Utility Model Publication No. 6-37446). However, probably because the structure of the direct-acting valve is not simple as compared with a single-plate check valve represented by the foregoing wafer-type valve, there has conventionally been no wafer-type direct-acting valve.

However, if the valve box is formed with the flanges as is the case of the flange-shaped direct-acting valve, there arises problems such that not only the valve itself becomes heavy in weight but also the manufacturing cost of the valve rises caused by the high material cost of the flanges themselves.

An objective of the present invention is to provide a wafer-type direct-acting valve in which no flange is formed on a valve box, and piping is achieved by sandwiching the valve box between pipe flanges and the pipe flanges are tightened with each other by bolts and nuts.

SUMMARY OF THE INVENTION

In view of the problems described above, the present invention provides a wafer-type direct-acting valve comprising: a driving section operating when it senses a primary pressure or a secondary pressure, a valve body communicating with the driving section to open and close a flow path; and a valve box which is sandwiched or positioned between pipe flanges tightened by bolts and nuts, connecting end portions of the valve box having an inlet and an outlet into and from the flow path respectively. Each of the connecting end portions are free of bolt flanges and are formed to have a smaller diameter than that of the pipe flanges. The valve box further includes a cover flange neck extending upward from the valve box, and only side walls of the cover flange neck corresponding to the respective adjacent bolts are connected in such a manner that the cover flange neck can be interposed between the bolts located between the pipe flanges to be adjacent on a circumference of the pipe flanges.

Further, an annular groove may be formed into the shape of recess on the surfaces of the connecting end portions to be mated with the pipe flanges, and the annular groove may be filled with a sealing member.

According to the present invention, in the direct-acting valve, the valve box of the direct-acting valve is sandwiched between the pipe flanges tightened with each other by bolts and nuts. Further, the connecting end portions to be mated with the pipe flanges, which are respectively formed with the inlet and outlet of the flow path in the valve box, are flangeless. Thus, it is possible to achieve drastic reduction in the total weight of the valve, reduction in the dimensions between side surfaces (i.e. the connecting end portions), and reduction in the number of bolts required for piping to half. The space for the installation of the valve box between the pipe members can also be reduced. Further, the installation work at the time of piping can be efficiently achieved and thus, the load to the pipe members in the piped state can be reduced. In addition, the material cost required for the flanges can be reduced, and thus, the manufacturing cost can be drastically reduced.

Further, the cover flange neck extending upward from the valve box is formed into a structure where only its side walls corresponding to the adjacent bolts are connected. Due to this structure, when the piping is made by interposing the valve between the pipe members having pipe flanges at their end portion, the connected portion of the cover flange neck avoids the adjacent bolts provided between the pipe flanges so as not to obstruct the installation of the bolts. Thus, the cover flange neck can be interposed between adjacent bolts and the bolts can be threaded into the bolt holes of the pipe flanges without causing any troubles. By tightening the bolts by nuts, the valve can be interposed between the pipe members without any difficulty.

Further, according to the present invention, even if the interval between the bolts through which the cover flange neck interposed is narrow, and the inner portion of the cover flange neck corresponding to the connected portion is narrowed toward the direction along which the connected portion is formed, there is no need of narrowing the inner portion of the cover flange neck toward the direction along which the bolts are installed. Therefore, the area for the passage of the pressure fluid through the inside of the cover flange neck corresponding to the connected portion can be ensured sufficiently in such a manner that no trouble is caused in driving the valve body by the driving section. As a result, the function as a direct-acting valve can be more satisfactorily achieved.

Since an annular groove is provided into the shape of recess on the surfaces of the connecting end portions to be mated with the pipe flanges, and the annular grooves are filled with sealing members. At the time when piping is made, by simply bringing the connecting end portions and the pipe flanges into contact with each other, the sealing members intervene between the connecting end portions and the pipe flanges so as to tightly seal therebetween.

Therefore, according to the present invention, the connecting end portions and the pipe flanges can be easily mated in a tightly sealed state without any effort as described above. In a conventional method, when installing a sealing member such as a gasket between the connecting end portions and the pipe flanges, the sealing member must be positioned in a state suspended in the air on the same axis of the pipe flanges and at a position between the pipe flanges and the connecting end portions having a diameter smaller than the pipe flanges, while the valve is supposed so that the connecting end portions of the valve are located on the same axis of the pipe flanges. Then, the connecting end portions and the pipe flanges are mated with each other. This operation is very cumbersome and needs effort. Contrarily, according to the present invention, a trouble involved in the piping work of the conventional wafer-type valve can be resolved, and the operation efficiency can be drastically improved. Thus, the practical effect of the present invention is enormous.

DESCRIPTION OF THE PREFERRED EMBODIMENTS

Figure 1:
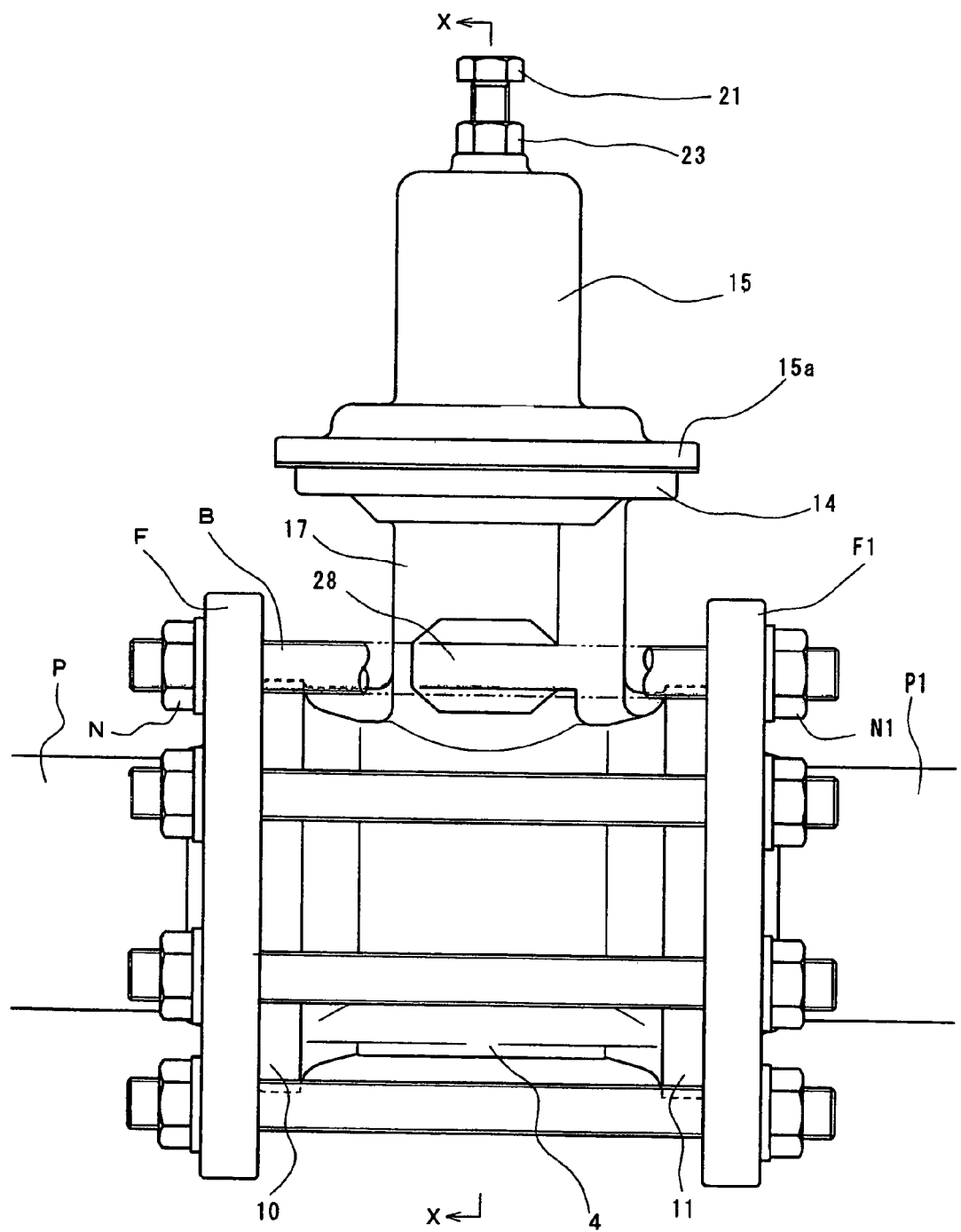
FIG. 1 is a front view showing a piping state of a wafer-type direct-acting valve.

Hereinafter, an example as an embodiment of the present invention will now be described based on the drawings.

This valve is a direct-acting valve, including a driving section 1 which operates when it senses a primary pressure or a secondary pressure, and a valve body 3 communicated with the driving section 1 and operated to open and close a flow path 2. The illustrated valve shows a direct-acting pressure reducing valve.

The structure of this direct-acting pressure reducing valve is as follows. A valve box 4 includes a flow path 2 (including a primary flow path 2a and a secondary flow path 2b), and a driving section 1 incorporated into the valve box 4. The driving section 1 controls the opening of the valve body 3 in accordance with the variation in the pressure in the secondary flow path 2b. The driving section 1 includes a pressure detecting chamber 5 in communication with the secondary flow path 2b for detecting the pressure in the secondary flow path 2b. In a piping state, the valve box 4 is sandwiched between pipe flanges F and F1 provided at the connecting end portions of piping members P and P1, and is supported interposedly between the pipe flanges F and F1 by tightening (long threaded) bolts B, B1 . . . penetrated through the pipe flanges F and F1 by nuts N, N1 . . . .

The valve box 4 is formed with an inlet 6 and an outlet 7 at its left and right sides respectively. Inside the valve box 4, there are a primary flow path 2a and a secondary flow path 2b communicating with the inlet 6 and the outlet 7, respectively.

At the center inside the valve box 4, a partitioning wall 8 partitions the primary flow path 2a from the secondary flow path 2b into the upper and lower sections. The partitioning wall 8 has a valve opening 9 for allowing both the flow paths 2a and 2b to communicate with each other. The flow path 2 extending from the inlet 6 to the outlet 7 is formed into the shape of the letter S.

Further, the valve box 4 is flangeless, wherein the connecting end portions 10 and 11 of the valve box 4 respectively have the inlet 6 and the outlet 7 of the flow path 2 respectively connected with the pipe flanges F and F1 in such a manner that the valve box 4 is sandwiched between the pipe flanges F and F1. Due to this structure, the distance between side surfaces of the valve box 4 is reduced by the thicknesses of the flanges as compared with a conventional flange-shaped valve box.

On the surfaces of the connecting end portions 10 and 11 to be mated with the surfaces of the pipe flanges F and F1, a recessed annular groove 12 is formed. The annular groove 12 is filled with a sealing member 13 such as an O-ring, a flat-type packing and the like (in the illustrated example, an O-ring is used).

At the upper portion of the valve box 4, a cover flange neck 17 extends upward from the top end of the valve box 4. Further, a disc-shaped recessed portion 16 entirely surrounded by a body covering flange (i.e. a flange for connection with a later-described bonnet 15) 14 is provided on the top end of the cover flange neck 17.

The cover flange neck 17 is interposed between the pipe flanges F and F1 in a state where the connecting end portions 10 and 11 of the valve box 4 are brought into contact with the pipe flanges F and F1, and where bolts B, B1 . . . are penetrated through the pipe flanges F and F1. Also, the cover flange neck 17 is in the shape capable of interposing between the bolts B and B1 adjacent to each other on the circumference of the pipe flanges F and F1 (in the illustrated example, the bolts B and B1 are provided to be adjacent to each other at the upper portions of the pipe flanges F and F1).

A bonnet 15 is formed into a substantially cylindrical shape, and the diameter of its lower end is enlarged to match the recessed portion 16. The lower opening end of the bonnet 15 is entirely surrounded by a flange 15a.

The recessed portion 16 and the bonnet 15 are mated with each other via a diaphragm 18. Then, their flanges 14 and 15a are tightened by unillustrated bolts and nuts. An adjustment spring 19 is provided in an upper space (inside the bonnet 15) partitioned by the diaphragm 18, whereas the lower space (inside the recessed portion 16) is used as a pressure detecting chamber 5, so as to constitute the driving section 1.

The adjustment spring 19 is made of a compression coil spring (in the illustrated example, a rectangular spring). The adjustment spring 19 is interposed in a compressed state between a spring receptor 20 which also serves as a diaphragm pressing member and is mated with the upper surface of the diaphragm 18, and a spring receptor 22 compressed downward by an adjustment screw 21 made of a bolt which is inserted and screwed from the upper end of the bonnet 15.

The adjustment screw 21 is moved upward and downward to adjust the elastic force of the adjustment spring 19, so that the displacement of the diaphragm 18 located below the adjustment screw 21 is adjusted.

At the upper end of the bonnet 15, a lock nut 23 screwed to the adjustment screw 21 is provided.

The pressure detecting chamber 5 (i.e. the recessed portion 16) is opened at its lower portion so as to communicate with the primary flow path 2a and the secondary flow path 2b separately via the cover flange neck 17. An opening 24 communicating with the primary flow path 2a is formed into the circular shape at the lower center of the pressure detecting chamber 5 in such a manner as to correspond to the valve opening 9. The other opening 25 communicating with the secondary flow path 2b is formed into a substantially rectangular shape, and is adjacent to the opening 24.

Therefore, inside the cover flange neck 17, the upper end of the partitioning wall 8 is formed to rise in such a manner that it partitions the openings 24 and 25 adjacent to each other. The partitioning wall 8 partitions the communicating path 26 communicating with the primary flow path 2a from the communication path 27 communicating with the secondary flow path 2b.

Figure 2:
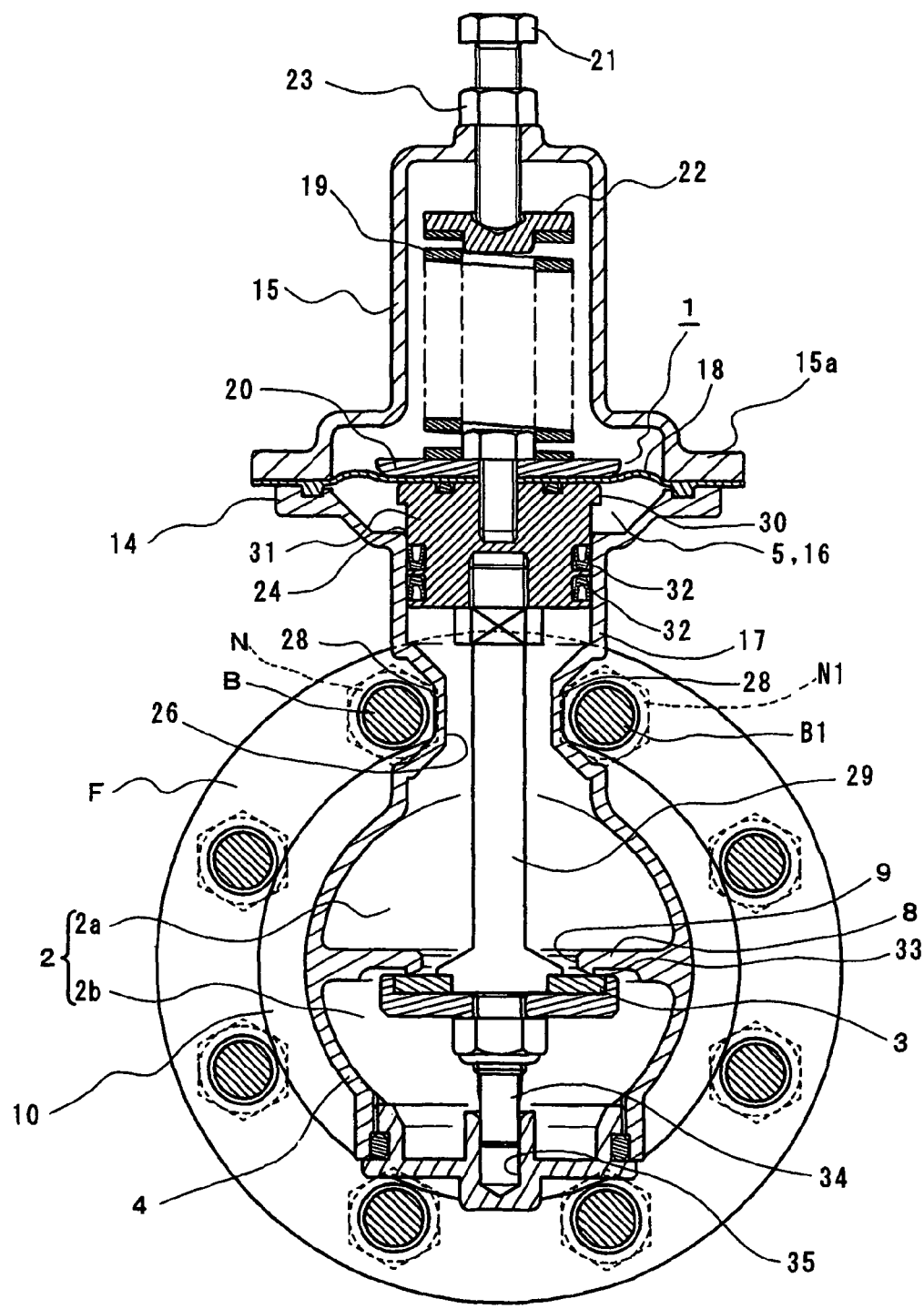
FIG. 2 is a cross-sectional view along the line X-X of FIG. 1.
Figure 3:
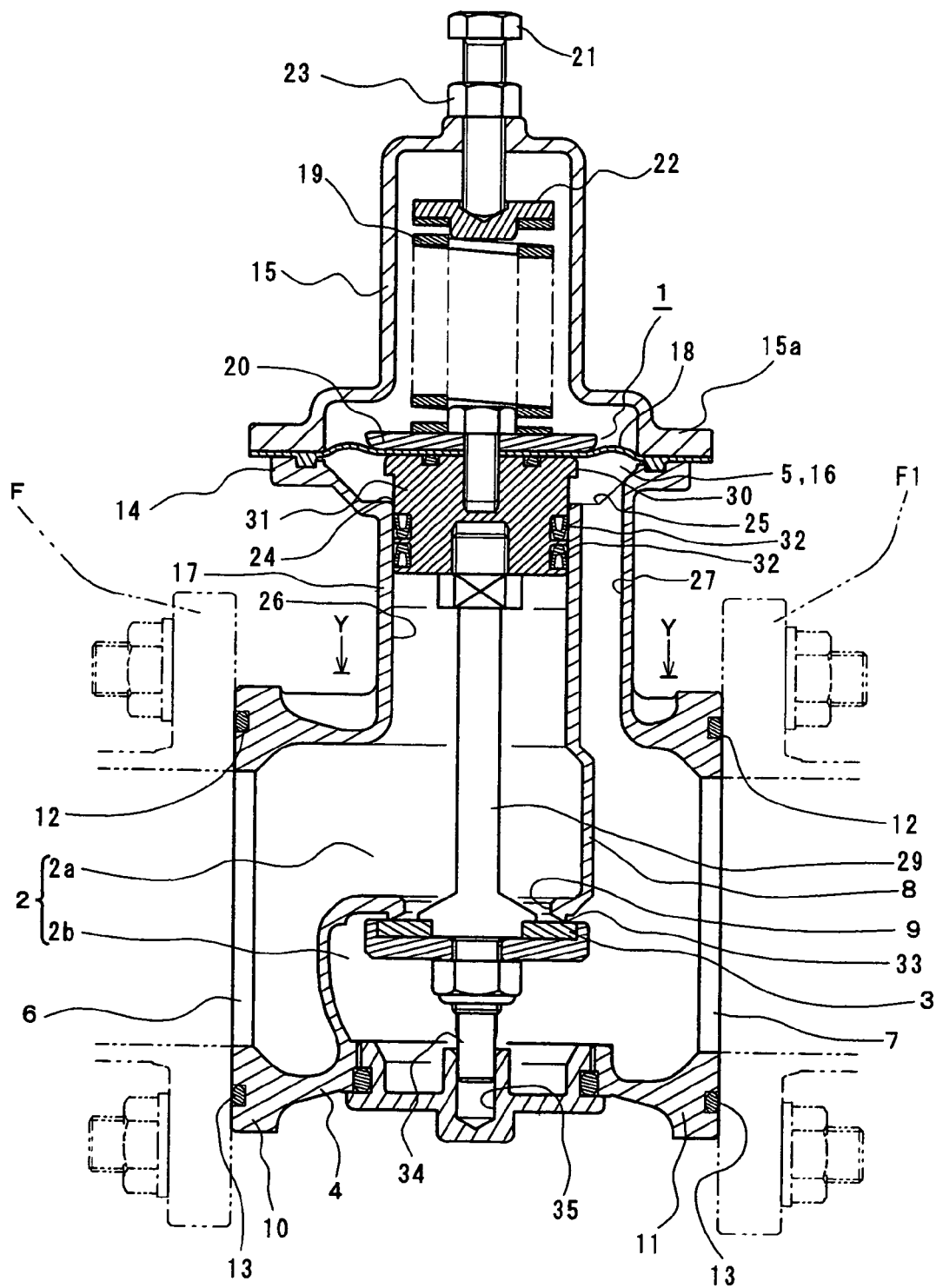
FIG. 3 is a longitudinal sectional view along the line X-X of FIG. 1.
Figure 4:
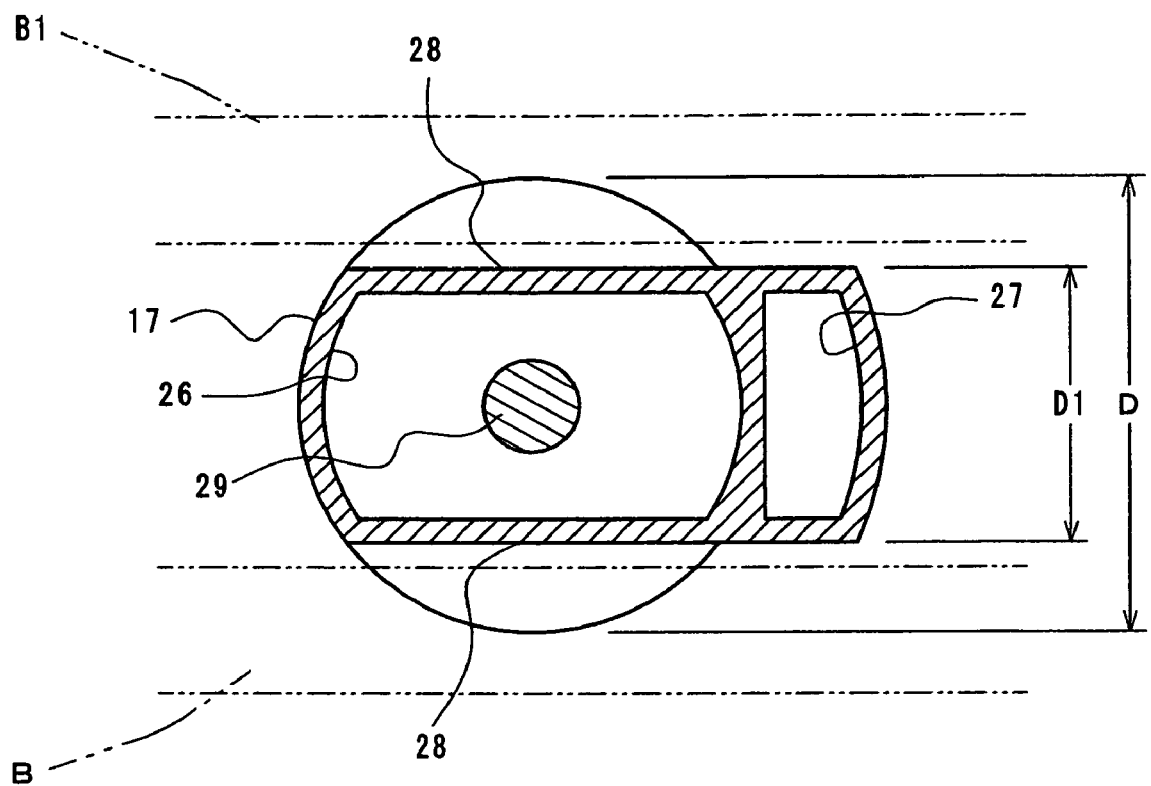
FIG. 4 is an enlarged cross-sectional view along the line Y-Y of FIG. 3, partly omitted.

The communicating paths 26 and 27 are formed into a cylindrical shape and a substantially rectangular cylindrical shape respectively identical to the shapes of the openings 24 and 25. As described above, in the state of piping of the valve box 4, in order to enable the cover flange neck 17 to be interposed between the bolts B and B1 provided adjacent to each other between the upper portions of the pipe flanges F and F1, at the sites corresponding to the bolts B and B2 of the communication path 26 having a diameter larger than the interval between the bolts B and B1, as shown in FIGS. 2 and 3, only the side walls of the cover flange neck 17 corresponding to the bolts B and B1 adjacent to each other are formed to be connected. The communicating path 26 at the connected portion 28 is formed into the same width as the communicating path 27 as shown in FIG. 4.

In this embodiment, the outer width D of the cover flange neck 17 corresponding to the width direction of the communicating path 26 (i.e. a direction intersecting the direction along which the bolts B and B1 are provided) is made to be larger than the interval between the bolts B and B1. In addition, the outer width D1 of the cover flange neck 17 corresponding to the width direction of the communication path 27 is made to be smaller than the interval between the bolts B and B1 along its vertical direction. In this manner, the site of the side wall of the cover flange neck 17 having the outer width D corresponding to the bolts B and B1 is formed with the connected portion 28 in such a manner that the shape of the portion 28 throttles the communicating path 26 located inside the cover flange neck 17. Alternatively, when the outer width D1 is also larger than the interval between the bolts B and B1, the side wall of the cover flange neck 17 having the outer width D1 is also formed with the connected portion 28 same as the above.

The communicating path 26 causes no trouble in the valve function as far as the pressure fluid can pass through the connected portion 28 even after a later-described valve bar 29 is penetrated through the communicating path 26. In any cases, the pressure fluid will be throttled down at the connected portion 28. In order that the driving section 1 drives the valve body 3 with more satisfactory operability, it is preferable that the connected portion 28 has an area for the passage of the pressure fluid as large as possible. In this regard, it is more preferable that the connected portion 28 is formed by only connecting the side walls of the cover flange neck 17 corresponding and adjacent to the bolts B and B1 respectively.

Since the pipe flange F and F1 employed are those standardized in accordance with the size of the valve, the interval between the bolts B and B1 differs depending on the kind of the pipe flanges F and F1. Even if the interval is narrow and the communication path 26 at the connected portions 28 is formed to be narrow in its width direction, only the side walls of the cover flange neck 17 are connected at the sites corresponding and adjacent to the bolts B and B1 as described above. There is no need of connecting or narrowing the side walls of the cover flange neck 17 in the direction along which the bolts B and B1 are provided. Therefore, it is possible to ensure a predetermined area for the passage of the pressure fluid in the communication path 26 at the connected portion 28 without causing any trouble in driving the valve body 3 by the driving section 1.

On the lower surface of the diaphragm 18, a diaphragm receptor 30 is mated. The lower portion of the diaphragm receptor 30 is integrally formed with a piston 31 having a diameter smaller than the diaphragm receptor 30 and the same as the communication path 26.

The piston 31 is slidably inserted into the area of the communication path 26 above the connected portion 28. A U-shaped packing 32 is fitted into a recessed groove formed entirely around the piston 31, so as to partition the primary flow path 2a from the pressure detecting chamber 5 in a water-tight state.

From the center of the lower portion of the piston 31, a valve bar 29 is extended downward vertically and penetrates through the communication path 26 and the valve opening 9. On the bottom end of the valve bar 29, a valve body 3 for opening and closing the valve opening 9 is attached. The valve body 3 and the driving section 1 are connected with each other.

The valve body 3 is situated onto a valve seat 33 provided to a lower opening end of the valve opening 9 in a freely separable manner so that the valve body 3 receives the primary pressure along the valve opening direction. Therefore, the opening of the valve body 3 is controlled by the displacement of the diaphragm 18.

In the state where the diaphragm 18 displaces to its lowest position, the diaphragm receptor 30 manner on the circumference of the opening 24 of the communication path 26 and prevents the valve body 3 from lifting up in this state.

Further, a guide bar 34 is extended vertically downward from the center of the lower portion of the valve body 3. The guide bar 34 is inserted in a freely slidable manner into the cylindrical recessed portion 35 projecting from the bottom portion of the valve box 4.

The effective pressure receiving area of the piston 31 is set to be slightly larger than the primary effective pressure receiving area of the valve body 3.

At the time of piping in the wafer-type direct-acting valve structured as described above, the connecting end portions 10 and 11 of the valve box 4 are respectively mated with the pipe flanges F and F1 provided to the pipe members P and P1. Then, the bolts B, B1 . . . are penetrated through the respective bolt holes of the pipe flanges F and F1.

In this state where the bolts B and B1 are located adjacent to each other at the upper portions of the pipe flanges F and F1, the connected portion 28 located close to the bolts B and B1 correspondingly avoids the bolts B and B1 so as not to obstruct the installation thereof. Thus, the cover flange neck 17 can pass between the bolts B and B1, and a large number of bolts B, B1 . . . located on the circumference of the pipe flanges F and F1 are uniformly tightened by the nuts N, N1 . . . , and the valve is fixed interposedly between the pipe members P and P1.

By tightening the bolts B, B1 . . . by nuts N, N1 . . . , the sealing member 13 within the annular groove 12 formed in the respective connecting end portions 10 and 11 elastically deforms, and tightly adheres to the end surfaces of the pipe flanges F and F1 for connection with the connecting end portions 10 and 11. In this manner, the connecting end portions 10 and 11 and the pipe flanges F and F1 are tightly sealed against each other.

In the valve piped as described above, the opening of the valve body 3 is controlled by establishing balance between the upward (i.e. the valve-closing direction) force exerted to the diaphragm 18 by the secondary pressure in the pressure detecting chamber 5 communicating with the secondary flow path 2b via the communicating path 27 and the downward (i.e. the valve-opening direction) force exerted by the adjustment spring 19. As a result, the secondary pressure is kept at a constant pressure lower than the primary pressure.

In this embodiment, the wafer-type direct-acting valve is demonstrated as a direct-acting type pressure reducing valve. However, the present invention is not limited thereto, but may be applied to other direct-acting type pressure adjusting valves (back pressure valves, differential pressure valves, and the like), solenoid valves, regular water level valves, and other direct-acting valves. In these cases, as in the embodiment above, each of the connecting end portions of the valve box is free of bolt flanges and is formed to have a smaller diameter than that of the pipe flange, and the cover flange neck extending upward from the valve box is formed into the structure capable of being interposed between the bolts located adjacent to each other at the upper portions of the pipe flanges.

What is claimed is:

1. A wafer-type direct-acting valve comprising:
a driving section operating when it senses a primary pressure or a secondary pressure of a pressure fluid;
a valve body communicating with the driving section to open and close a flow path through which the pressure fluid can pass; and
a valve box which defines the flow path and is sandwiched between pipe flanges which are tightened together by bolts extending between said pipe flanges and nuts, connecting end portions of the valve box having an inlet and an outlet into and from the flow path respectively which permit said pressure fluid to flow therethrough, which said connecting end portions are respectively positioned in cooperation with said pipe flanges, each of the connecting end portions being formed to have a smaller diameter than that of the pipe flange in cooperation therewith, wherein the valve box further includes a cover flange neck extending upward from the valve box and having opposite side walls which define a space through which the pressure fluid can pass and which only receives a valve bar extending through said space connecting the driving section to the valve body, said side walls being disposed directly adjacent to corresponding ones of said bolts, and the side walls of the cover flange neck corresponding to the respective adjacent bolts are constricted in such a manner to define a narrow neck dimension of said cover flange neck that is narrower than a bolt interval between the adjacent bolts, wherein the bolt interval varies depending on the kind of pipe flanges being used in accordance with the size of the valve and the narrow neck dimension is formed such that the cover flange neck can be interposed between the bolts located between the pipe flanges in accordance with the bolt interval, which said bolts are adjacent to each other on a circumference of the pipe flanges, and wherein said cover flange neck has a wide neck dimension defined in a direction parallel to a direction in which the bolts extend between the pipe flanges, the wide neck dimension being greater than the narrow neck dimension.

2. A wafer-type direct-acting valve according to claim 1, wherein an annular groove filled with a sealing member is formed into a shape of a recess on surfaces of the connecting end portions to be mated with the pipe flanges.

3. A wafer-type direct-acting valve according to claim 1, wherein the bolt interval between said bolts directly adjacent said side walls of said cover flange neck is closely proximate the narrow neck dimension defined between said side walls and less than a width of said valve box.

4. A wafer-type direct-acting valve according to claim 3, wherein said cover flange neck is formed as an integral extension of said valve box.

5. A wafer-type direct-acting valve comprising:
a driving section operating when it senses a primary pressure or a secondary pressure of a pressure fluid;
a valve body communicating with the driving section to open and close a flow path through which said pressure fluid can pass;
a valve box defining a flow path in which said valve body is operably supported, said valve box having opposite connecting end portions which are sandwiched between spaced apart pipe flanges which project radially and are tightened together by bolts extending in a bolt direction between said pipe flanges, said bolts being circumferentially spaced apart so as to have a bolt spacing therebetween, and said connecting end portions of the valve box having an inlet and an outlet into and from the flow path respectively and each having a smaller diameter than said pipe flanges such that said bolts are spaced circumferentially in surrounding relation about an exterior of said valve box, the valve box further including a cover flange neck extending radially outwardly from the valve box through the bolt spacing between a circumferentially adjacent pair of said bolts, said cover flange neck having a first opposite pair of side walls spaced from one another to define a first narrow neck dimension closely proximate said bolt spacing with said adjacent bolts disposed directly adjacent said first pair of said side walls and a second opposite pair of side walls spaced from one another to define a second wide neck dimension greater than said first narrow neck dimension, said second wide neck dimension being defined along an axis of said cover flange neck which is parallel to the bolt direction, said first pair of said side walls of said cover flange neck defining a passage between said flow path and said driving section through which only a valve bar extends between said driving section and said valve body, said valve bar being in spaced relation from said first pair of said side walls and said first narrow neck dimension can be varied depending upon said bolt spacing while permitting the pressure fluid to pass through said passage.

6. A wafer-type direct-acting valve according to claim 5, wherein said bolt spacing between said bolts directly adjacent said side walls of said first pair of side walls of said cover flange neck is closely proximate said first narrow neck dimension between said side walls of said first pair of side walls and less than a width of said valve box.

7. A wafer-type direct-acting valve according to claim 6, wherein said cover flange neck is formed as an integral extension of said valve box to prevent vertical removal of said cover flange neck through said bolt spacing.

8. A wafer-type direct-acting valve according to claim 7, wherein said side walls of said first pair of side walls have outer portions defining a third neck dimension of said cover flange neck and have radially-adjacent recessed portions defining said first narrow neck dimension of said cover flange neck which first narrow neck dimension is smaller than said third neck dimension and is disposed radially adjacent thereto and radially inwardly thereof, said bolt spacing of said pair of said adjacent bolts being proximate said first narrow neck dimension and less than said third neck dimension such that said bolts extend along and within said recessed portions between said pipe flanges.

9. A wafer-type direct-acting valve according to claim 5, wherein said side walls of said first pair of side walls have outer portions defining a third neck dimension of said cover flange neck and have radially-adjacent recessed portions defining said first narrow neck dimension of said cover flange neck which first narrow neck dimension is smaller than said third neck dimension and is disposed radially adjacent thereto and radially inwardly thereof, said bolt spacing of said pair of said adjacent bolts being proximate said first narrow neck dimension and less than said third neck dimension such that said bolts extend along and within said recessed portions between said pipe flanges.

10. A wafer-type direct-acting valve according to claim 9, wherein said recessed portions define a fourth neck dimension of said cover flange neck in the bolt direction and said first neck dimension in the direction of the bolt spacing so that said passage defines spaces about said valve bar in both the direction of the first neck dimension and the direction of the fourth neck dimension.

11. A wafer-type direct-acting valve according to claim 10, wherein a size of said passage is variable by varying said first neck dimension in accord with the bolt spacing and varying said fourth neck dimension of said recessed portions in accord with variations in the first narrow neck dimension.

12. A wafer-type direct-acting valve comprising:
a valve box communicating with a primary flow path and a secondary flow path through a valve opening, the valve box including a valve body that opens and closes the valve opening, and a driving section connected to the valve body to control a degree of opening of the valve body depending on variation in pressure in the primary flow path or the secondary flow path,
wherein the valve box in a valve is sandwiched between pipe flanges tightened by bolts and nuts, and connecting end portions of the valve box having an inlet and an outlet of pressure fluid into and from the flow path respectively; the valve box further includes a cover flange neck that extends upward from the valve box, has a space through which the pressure fluid can pass therein and inserts only a valve bar connecting the driving section to the valve body therethrough, and the cover flange neck has a first narrow neck dimension which is narrower than an interval between a circumferentially-adjacent pair of bolts which interval differs depending on the kind of pipe flanges used in accordance with a size of the valve in such a manner that the cover flange neck can be interposed between the circumferentially-adjacent pair of bolts located between the pipe flanges, and the cover flange neck has a second wide neck dimension defined in a direction parallel to a direction in which the bolts extend between the pipe flanges, the second wide neck dimension being greater than the first narrow neck dimension.

13. A wafer-type direct-acting valve according to claim 12, wherein an annular groove is formed into a shape of a recess on the surfaces of the connecting end portions to be mated with the pipe flanges, and the annular groove is filled with a sealing member.

* * * * *